United States Patent
Ochsenfeld

(10) Patent No.: US 9,906,028 B2
(45) Date of Patent: Feb. 27, 2018

(54) METHOD AND SYSTEM FOR OPERATING AN ELECTRICAL ENERGY SUPPLY NETWORK

(71) Applicant: SIEMENS AKTIENGESELLSCHAFT, Munich (DE)

(72) Inventor: Henning Ochsenfeld, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 221 days.

(21) Appl. No.: 14/443,083

(22) PCT Filed: Nov. 20, 2012

(86) PCT No.: PCT/EP2012/073076
§ 371 (c)(1),
(2) Date: May 15, 2015

(87) PCT Pub. No.: WO2014/079476
PCT Pub. Date: May 30, 2014

(65) Prior Publication Data
US 2015/0318696 A1    Nov. 5, 2015

(51) Int. Cl.
*G06F 19/00* (2011.01)
*H02J 3/00* (2006.01)
(Continued)

(52) U.S. Cl.
CPC .............. *H02J 3/00* (2013.01); *G05B 15/02* (2013.01); *H02J 3/381* (2013.01); *H02J 3/46* (2013.01)

(58) Field of Classification Search
USPC ........................................................ 700/287
See application file for complete search history.

(56) References Cited

U.S. PATENT DOCUMENTS 6,633,823 B2 * 10/2003 Bartone ................ H02J 3/14
700/295
8,401,709 B2 * 3/2013 Cherian ................ H02J 3/00
700/291
(Continued)

FOREIGN PATENT DOCUMENTS

EP    2355294 A2    8/2011

OTHER PUBLICATIONS

Sanchez et al., Clients segmentation according to their Domestic Energy Consumption by use of Self-Organizaing Maps, no dated, Sanchez et al. p. 1-6.*
(Continued)

*Primary Examiner* — Kidest Bahta
(74) *Attorney, Agent, or Firm* — Laurence Greenberg; Werner Stemer; Ralph Locher

(57) ABSTRACT

An electrical energy supply network has plurality of electrical energy users and/or energy generators that are connected to a common control device. In order to operate as efficiently as possible, with newly added energy generators and energy users to be linked into the existing control system, at least two energy profile groups are provided. The energy users and/or energy generators are assigned to the groups such that energy users having the same or similar energy consumption time series and energy generators having the same or similar energy generation time series are assigned to the same energy profile group. A further energy user or energy generator is assigned to one of the energy profile groups and all energy generators and energy users of an energy profile group are operated in an identical manner by the control device.

11 Claims, 4 Drawing Sheets

(51) Int. Cl.
*G05B 15/02* (2006.01)
*H02J 3/38* (2006.01)
*H02J 3/46* (2006.01)

(56) References Cited

U.S. PATENT DOCUMENTS

| | | | |
|---|---|---|---|
| 8,989,910 B1* | 3/2015 | Klots | G06Q 50/06 700/291 |
| 2003/0101009 A1* | 5/2003 | Seem | H02J 3/00 702/61 |
| 2007/0038335 A1* | 2/2007 | McIntyre | H02J 3/00 700/295 |
| 2010/0274407 A1* | 10/2010 | Creed | H02J 3/14 700/295 |
| 2012/0245752 A1* | 9/2012 | Borrett | G06Q 10/06 700/295 |

OTHER PUBLICATIONS

Pal et al., Time Series Clustring for Demand Response an online Algorithmic Approch, 2009, IEEE, p. 1-13.*
T. Warren Liao, Clusering of time series data—a survey, Jun. 21, 2004, Louisiana State University, p. 1-18.*
Teuvo Kohonen: "Self-Organizing Maps", Sep. 1, 1996 (Sep. 1, 1996), Springer Series in Information Sciences, Springer Berlin, DE, XP007910976, ISSN: 0720-678X, pp. 105-176 (uploaded as part1 and part 2).

* cited by examiner

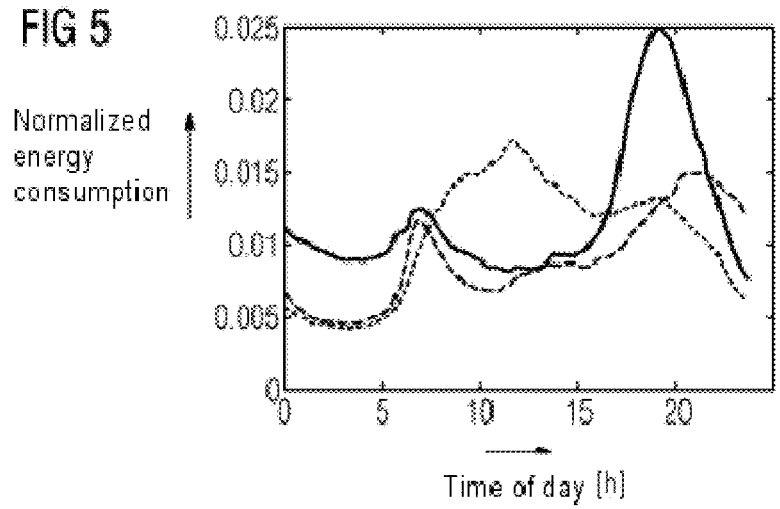
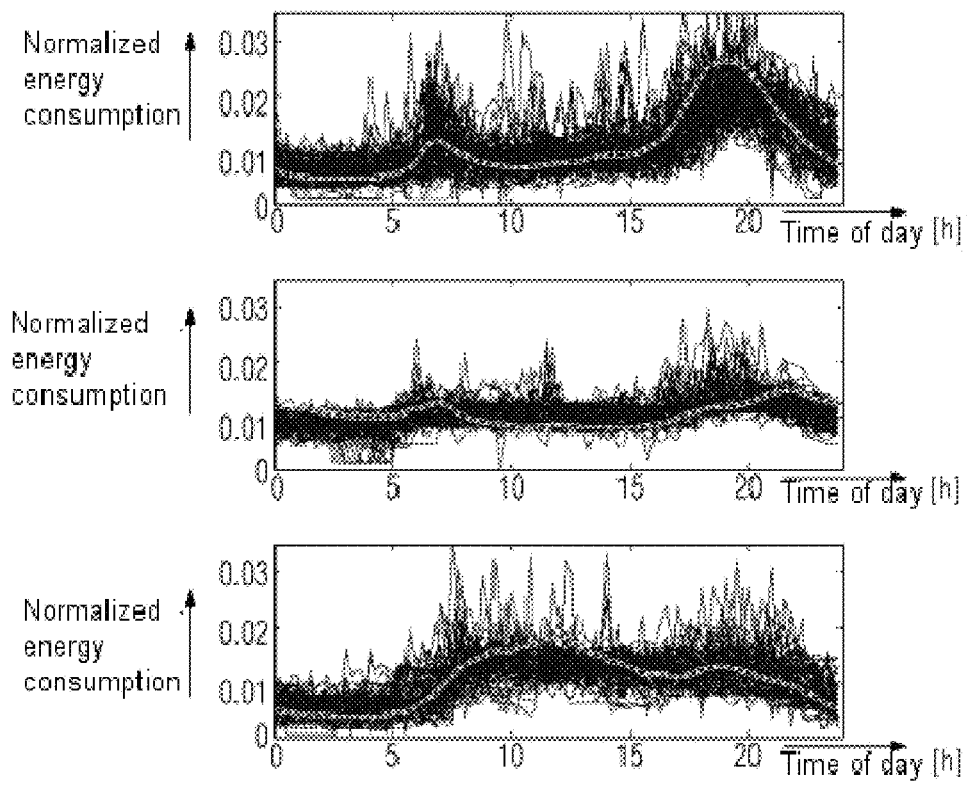

METHOD AND SYSTEM FOR OPERATING AN ELECTRICAL ENERGY SUPPLY NETWORK

BACKGROUND OF THE INVENTION

Field of the Invention:

The invention relates to a method for operating an electrical energy supply network comprising a plurality of electrical energy consumers and/or energy generators connected to a common control device. The invention also relates to a system having a control device for carrying out such a method.

Conventionally constructed electrical energy supply networks are set up, in principle, to deliver electrical energy from comparatively few central energy generators, for example coal-fired power plants, to the end consumers. The transmission direction of such energy distribution systems is substantially constant; furthermore, the generation of energy is adapted to the—predicted and/or actual—energy requirement by the end consumers.

In contrast, recent developments and political specifications have resulted in liberalization of the electrical energy market. This means that electrical energy provided by decentralized energy generators, for example wind energy installations, small combined heat and power plants, biogas installations and photovoltaic installations, has been increasingly fed into the energy supply networks at the medium or low voltage level for some years, which resulted in a radical change in the previously conventional transmission direction. Decentralized energy generators providing electrical energy from regenerative sources such as wind or sunlight are also distinguished by severe fluctuations in terms of the electrical power provided by them; for example, a wind power installation can deliver a comparatively large amount of electrical power to the energy supply network in the case of strong wind, whereas the electrical power delivered can fall to zero in the case of light wind or even no wind.

This problem was previously predominantly counteracted by having so-called peak load power plants available which are activated at times of low decentralized supply or a particularly high energy consumption by electrical end consumers. However, the practices of having such only comparatively rarely required peak load power plants available and operating them are associated with high costs.

Another possible way of leveling the electrical energy irregularly provided by the energy supply network as a result of volatile energy supplies involves operating energy stores, in which case so-called pumped-storage plants are used, in particular. If there is a surplus of electrical energy in the energy supply network, the storage capacitances are charged, for example by operating a pumped-storage plant during pumping, whereas the capacitances of the energy store are discharged if there is a lack of electrical energy in the energy supply network, for example by operating the pumped-storage plant as a hydroelectric power plant. However, such pumped-storage plants may not be provided everywhere on account of special environmental requirements (two adjacent different height levels); further energy stores, for example batteries, are still comparatively expensive.

The increased use of decentralized energy sources for supplying energy therefore necessitates new control concepts which relate to the distribution of electrical energy both at the high and medium voltage level and at the low voltage level down to the end consumer of electrical energy.

Such control concepts are often combined under the name "smart grid". An aim of such smart grid concepts is to efficiently control supply and demand for electrical energy in the energy supply network, with the result that fewer peak load power plants have to be provided, for example. In this case, on account of the greater incorporation of regeneratively generated electrical energy in the energy supply networks and the associated fluctuating supply situation, the generation-oriented influence of the energy consumption by the end consumer, on the one hand, but also the influence of the supply by decentralized energy generators, on the other hand, are becoming increasingly important. So-called "energy management systems" are used for this purpose.

For example, the applicant provides, under the name "DEMS" (decentralized energy management system), a control device for operating an energy supply network, with which energy generators and energy consumers of any type can be optimally matched to one another in terms of their respective operation. For this purpose, the energy generators and energy consumers are optimally controlled for grid operation management with respect to energy, economical and ecological aspects. The energy generators and energy consumers controlled using this control device are controlled using so-called "schedules" which are usually always stipulated the day before the respective operation and specify the operation of the energy generators and energy consumers on the basis of the time and are optimized according to the above-mentioned aspects. In order to determine the schedules, energy generation and energy consumption time series predicted for the respective energy generators and energy consumers are required, which time series indicate a prediction of the course of the electrical energy produced and consumed over a predefined time course, for example for a day, a week, a month or a year. Deviations from the predicted time courses may be determined by the control device during actual operation in real time and can be compensated for by means of subsequent control commands.

Whereas such optimized control by means of a control device of an energy management system is still readily possible for a comparatively small number of controllable decentralized energy generators and energy consumers, difficulties arise when incorporating a comparatively large number (for example several hundred) decentralized energy generators or energy consumers to be controlled in a common control system. This is because, on the one hand, it is very complicated, in terms of management, to separately evaluate the consumption data of each energy consumer or the supply behavior of each decentralized energy generator and to develop control on the basis thereof. For this purpose, an individual model of the respective energy consumer would have to be stored in the control device for the consumer side, for example, which would presuppose specific knowledge of individual installed electrical consumer devices. On the other hand, the stochastic consumption behavior of the respective energy consumers would make the consumption predictions needed to optimize the control virtually unusable on account of excessively high prediction variances. In addition, there are purely practically numerical limits during optimization in modern control devices: the mathematical mapping of a multiplicity of energy consumers or energy generators, which is needed to incorporate the energy generators or energy consumers in the control system, as an optimization problem would exceed the computing capacities of the control devices and would render a mathematical way of finding a solution impractical in terms of time and simply impossible. Said problem is intensified by the fact that, in accordance with the advancing decentralized grid expansion, further energy generators or energy consumers will be added to the existing energy generators or energy consumers in the short to medium term and likewise must be incorporated in the control by the control device.

BRIEF SUMMARY OF THE INVENTION

Therefore, the invention is based on the object of specifying a method and a system which can also be used to operate energy supply networks having a multiplicity of energy generators and/or energy consumers in a comparatively efficient manner, in which case newly added energy generators or energy consumers, in particular, can be incorporated in the existing control system for operating the energy supply network.

With respect to the method, this object is achieved, according to the invention, by means of a method for operating an electrical energy supply network comprising a plurality of electrical energy consumers and/or energy generators connected to a common control device, in which, in order to operate the energy supply network, at least two energy profile groups are provided, the energy consumers and/or energy generators being assigned to said energy profile groups in such a manner that energy consumers having the same or similar energy consumption time series and energy generators having the same or similar energy generation time series are each assigned to the same energy profile group. A further energy consumer is assigned to one of the energy profile groups using at least one energy consumption time series characteristic of said consumer, while a further energy generator is assigned to one of the energy profile groups using at least one energy generation time series characteristic of said generator. All energy generators and/or energy consumers in the same energy profile group are operated by the common control device using a group energy consumption time series or group energy generation time series characteristic of the respective energy profile group.

At this juncture, the term "energy consumer" can be understood as meaning either an individual electrical device whose consumed electrical power is measured separately or a group of electrical devices whose consumed electrical power is measured together. In both cases, provision may be made for the power consumption of the respective energy consumer to be able to be controlled by the control device, but the controllability is not a compulsory prerequisite. In connection with the invention, an energy consumer is therefore understood as meaning, for example, a "small customer" (for example a single-family house or apartment building, a small company, a small office operation) using electrical energy or an individual higher-power device (or installation) (for example an air-conditioning installation for a relatively large building or company) that consumes electrical energy.

The term "energy generator" can generally be understood as meaning all devices and installations as well as groups of devices (for example wind farms) which generate electrical energy and can be separately controlled by a control device of an energy management system. In particular, said term is intended to mean so-called decentralized energy generators having an electrical power that is smaller than large power plants, that is to say, for example, photovoltaic installations, wind power installations, combined heat and power plants, biogas installations.

A "control device" can be understood as meaning a data processing device, for example a controller of an energy management system, which is set up, on the one hand, to receive and process status information relating to the respective state of the energy consumers, the energy generators and the energy supply network and, on the other hand, to emit control commands to the energy generators and/or energy consumers and other controllable components of the energy supply network (for example transformer tap changers, switches). In this case, a control device need not necessarily consist of an individual device, rather a plurality of devices (also arranged in a locally distributed manner) may also interact as a control device as long as they are set up to implement a common control concept for operating the energy supply network.

The solution according to the invention consequently involves combining a plurality of energy consumers or energy generators to form energy profile groups, in which case, the similarity of their respective consumption or generation time series is used as a criterion for combining individual energy consumers or energy generators. Therefore, energy generators or energy consumers having a matching or similar temporal profile of the energy consumption or energy generation, that is to say having similar time series or "energy profiles", respectively form a common energy profile group. Following the group division, instead of the respective individual energy consumers or energy generators, only quasi "virtual" energy consumers or energy generators, in which accordingly higher electrical powers have been combined, need to be considered by the control device for the purpose of controlling the operation of the energy supply network. In this case, a characteristic group energy generation time series or characteristic group energy consumption time series is assigned to each energy profile group and used to create the control schedules mentioned above. On the one hand, this considerably reduces the number of energy consumers or energy generators to be incorporated in the control system, which is associated with a reduction in the computing power of the control device needed for optimization and control. In addition, a group of energy consumers or energy generators with similar time series shows considerably lower prediction variance than an individual energy consumer or energy generator, with the result that predictions can be made more easily and with greater reliability.

In order to provide the energy profile groups, one advantageous embodiment of the method according to the invention provides for known energy consumption time series of the energy consumers of the energy supply network and/or known energy generation time series of the energy generators of the energy supply network to be examined for existing similarities and for energy consumption time series similar to one another and energy generation time series similar to one another to be combined in a common energy profile group.

In this embodiment, the energy consumers or energy generators already existing in the energy supply network are therefore examined for similarities with regard to their energy consumption or energy generation time series and suitable energy profile groups are inferred using the existing similarities. In this manner, energy profile groups to be used need not be stipulated and predefined in advance, possibly without specific reference to the existing energy consumers or energy generators, but rather are specifically developed using the existing circumstances.

In this context, another advantageous embodiment of the method according to the invention may provide for the energy consumption time series and/or the energy generation time series to be provided as multidimensional vectors which represent a measured power obtained or delivered over a predefined consideration time window for a plurality of measurement times, for the multidimensional vectors to be mapped to a dimensionally reduced feature space in order to examine the energy consumption time series or energy generation time series for existing similarities, and for the energy profile groups to be determined inside the dimensionally reduced feature space.

This makes it possible to assign the time series of the energy generators or energy consumers to individual energy profile groups in a simpler manner since this must be carried out only in a dimensionally reduced feature space, that is to say a mathematical space with a reduced number of dimensions (features) in comparison with the dimensionality of the multidimensional vector. If, for example, a day is predefined as the consideration time window and a measured value indicating the energy generation or energy consumption is recorded every quarter of an hour, a vector having 96 dimensions (1440 min/15 min=96 measured values) results. Since a similarity analysis for all 96 dimensions would provide values of only limited use, the number of dimensions should first of all be reduced (for example by mapping to a two-dimensional space), with the result that a similarity analysis can then be carried out in the dimensionally reduced feature space.

Specifically, another advantageous embodiment may provide, for example, for the multidimensional vectors to be mapped to the dimensionally reduced feature space using the method of self-organizing maps.

Like when mapping sensory stimuli to a region in the human brain, the features are reduced in the method of self-organizing maps (SOM), with the result that similar input signals excite adjacent regions of a dimensionally reduced feature space (adjacent regions of the specially adapted two-dimensional map in the specific case). A training phase for "training" the self-organizing map first of all takes place. For example, such a training phase for self-organizing maps is described in "Teuvo Kohonen: Self-Organizing Maps, Springer-Verlag, 1997, 2nd edition". Since the features or dimensions by which the time series to be considered differ are not known before such a training phase, a "blind" search, as it were, is carried out in this case for a pattern occurring in the feature space, that is to say a search is carried out for similarities using the numerical structure of the temporal profiles. For this purpose, the Euclidean distances between the weight vectors, the so-called map units, are represented in a unified distance matrix which visualizes the distance values of the adjacent weight vectors differently, for example in terms of color. Similarities between the individual energy generators or energy consumers with regard to their respective time series can therefore be advantageously determined in the unified distance matrix. In this case, it is possible to observe, in particular, whether different areas are reflected on the map. An area (cluster) means that there must have been many similar input vectors there which have "pulled" the weight vectors there.

In order to be able to determine the respective energy profile groups in a particularly simple manner in this context without having to know and stipulate said energy profile groups in advance, another advantageous embodiment of the method according to the invention proposes that the "k-means method" or an extended "k-means method" is carried out in order to determine the energy profile groups in the dimensionally reduced feature space.

These group or cluster determination methods which are known per se can be used to stipulate affiliation of individual objects in the respective map (that is to say the mapping of the respective time series to the self-organizing map in the present case) to individual clusters (to the respective energy profile groups in the present case) with any desired starting points in a self-organizing map. In this case, a distance between the individual object and a cluster center is evaluated in each case. The individual objects are then assigned to that cluster to which they have the shortest distance. After this assignment, a new cluster center is determined using the assigned objects and the assignment method is started again. After a few iterations, stable clusters are produced and can be used as energy profile groups. Extended k-means methods optimize, for example, the starting value for the starting points or the iteration speed at which the method is carried out.

Another advantageous embodiment of the method according to the invention provides for the energy consumption time series and/or energy generation time series to be preprocessed using normalization before being examined for existing similarities.

This results in each data point in a time series being reduced solely to its "pattern information content", with the result that the actual temporal profile is not disrupted by independent components, for example offsets. The time series of the individual energy generators or energy consumers can thereby be compared with one another.

Further possible preprocessing steps involve sorting the time series, for example according to season and working day or non-working day, in order to eliminate rough temporal influences to the greatest possible extent. Optionally, so-called "outliers" (that is to say abnormal patterns or profile sections which occur only rarely) can also be discovered and rejected if necessary. This step would reduce distortion effects caused by outliers during the subsequent group analysis or cluster stipulation and during training of the classification algorithm and would increase the performance thereof. In order to conclude the data preprocessing, the incomplete data points caused by recording errors when recording the time series can also be rejected. In order to assign the further energy consumer or the further energy generator to one of the energy profile groups, another advantageous embodiment of the method according to the invention also provides for the energy consumption time series of the further energy consumer or the energy generation time series of the further energy generator to be compared with the model energy consumption time series characteristic of the respective energy profile group or the model energy generation time series characteristic of the respective energy profile group, and for the further energy consumer or further energy generator to be assigned to that energy profile group for which the comparison reveals the greatest similarity.

The comparison carried out for this assignment can be effected, for example, with the aid of a map trained by the above-mentioned method of self-organizing maps. In the case of such a trained map, a time series of a newly added energy generator or energy consumer excites those regions which are also excited by energy generators or energy consumers having similar time series, with the result that "similar" energy generators or energy consumers are assigned to the same energy profile groups.

Specifically, the comparison can be carried out in this context using the "nearest neighbor method" or the "learning vector quantization method", for example.

Another advantageous embodiment of the method according to the invention also provides for the provision of the energy profile groups and/or the assignment of energy consumers and/or energy generators to energy profile groups to be carried out repeatedly at regular intervals or in an event-controlled manner.

This makes it possible to regularly check the assignments and the group stipulation and to adapt it/them to changes which have possibly occurred, with the result that the control system is respectively optimally adapted to the current situation and composition of the energy consumers or energy generators.

The above-mentioned object is also achieved by means of a system for operating an electrical energy supply network comprising a plurality of electrical energy consumers and/or energy generators, having a control device which can be connected to the energy generators and/or energy consumers. The invention provides for the control device to be configured to carry out a method as claimed.

With respect to the descriptions and advantages, reference is made to the statements made with respect to the method according to the invention.

BRIEF DESCRIPTION OF THE SEVERAL VIEWS OF THE DRAWING

The invention shall be explained in more detail below using exemplary embodiments. In this respect.

FIG. 5 shows a graph having group energy consumption time series characteristic of the energy profile groups illustrated in FIG. 4; and FIG. 6 shows three graphs for illustrating the similarity between the energy consumption time series of the individual energy consumers with the group energy consumption time series characteristic of their respective energy profile groups.

DESCRIPTION OF THE INVENTION

Figure 1:
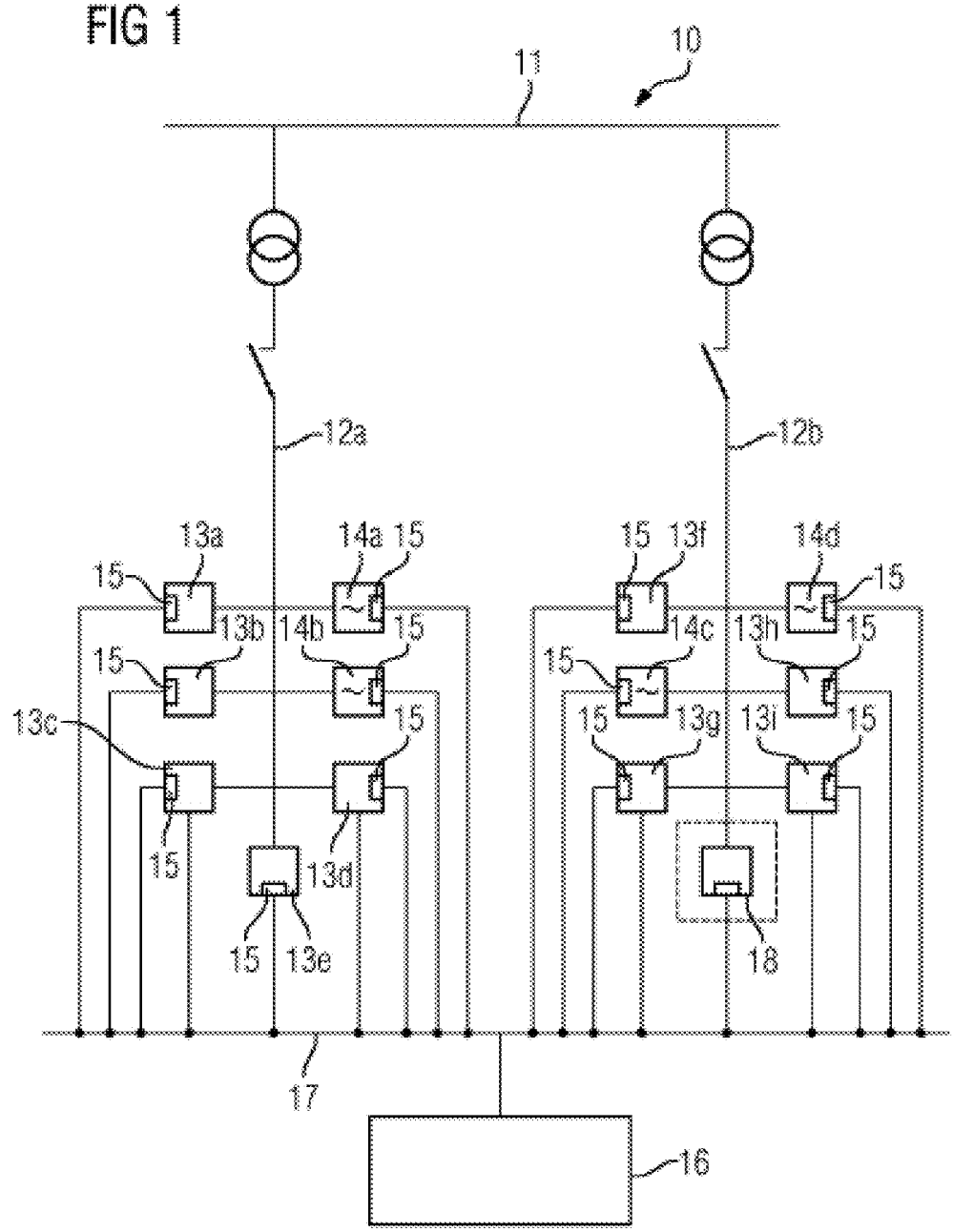
FIG. 1 shows a schematic view of a part of an electrical energy supply network having a number of electrical energy consumers and energy generators.

FIG. 1 shows a schematic view of a part 10 of an energy supply network which is otherwise not illustrated in any more detail. Two branch lines 12a and 12b leave from a busbar, and a plurality of energy consumers 13a-i and energy generators 14a-d are in turn connected to said branch lines. In FIG. 1, the energy consumers 13a-i and the energy generators 14a-d represent, by way of example, any desired number of electrical energy consumers and/or energy generators that have to be taken into account when optimally operating the energy supply network. The energy consumers 13a-i and energy generators 14a-d have devices 15 which are set up to record the electrical power consumed by the respective energy consumer 13a-i and delivered by the respective energy generator 14a-d. In addition, the devices 15 may be set up to control the respective energy consumer 13a-i or energy generator 14a-d using schedules or control commands transmitted by a common control device 16 of an energy management system. The respective devices are connected to the control device 16 via communication connections 17 for the purpose of transmitting the recorded power values and possibly receiving the control commands.

Since, as already explained above, the incorporation of each individual energy consumer or energy generator in the control concept of the control device 16 would be ineffective or unfeasible on account of the computing power of the control device, the individual energy consumers 13a-i or energy generators 14a-d are assigned to energy profile groups using the similarity of their energy consumption or energy generation time series, with the result that, instead of a multiplicity of separate energy consumers 13a-i and/or energy generators 14a-d, the control device 16 has to take into account only comparatively few "virtual" energy consumers or energy generators according to the energy profile groups when operating the energy supply network. The energy profile groups are provided and managed by the control device 16 using data technology; the power values received from the energy consumers or energy generators or possibly control commands to be transmitted thereto are incorporated by the control device 16 using the stored energy profile groups. Alternatively, it would also be possible to assign a "group control device" to each group, which group control device provides and manages the energy profile groups using data technology and accordingly interacts with the control device 16.

FIG. 1 also shows a further energy consumer 18 that is newly added to the existing energy consumers 13a-i and should be connected to the control device 16 by assigning it to one of the energy profile groups.

The procedure for forming the energy profile groups and for assigning the further energy consumer 18 to one of the energy profile groups is explained below using FIGS. 2 to 6. The explanations are given only by way of example using a further energy consumer 18; the formation of groups for the energy generators and the assignment of a further energy generator to a suitable energy profile group are carried out in a corresponding manner.

In order to be able to incorporate the individual energy consumers (there may be several hundred to several thousand depending on the energy supply network) in the control system of the control device, the individual energy consumers are combined to form energy profile groups, as already mentioned. For example, the energy consumption time series of one hundred energy consumers are combined in an energy profile group for this purpose. The energy consumption time series of the combined energy consumers which have been compressed in this manner are subsequently included in the actual network operation and optimization algorithms.

The matter now arises in this case according to the energy profile groups to be used, on the one hand, and according to the criteria which allow an energy consumer to be assigned to a particular energy profile group, on the other hand. Since it is assumed that there is no available knowledge of the environment of the individual energy consumer, the manual grouping according to particular criteria, for example according to electrical appliance types present in a household, is therefore virtually dispensed with. Therefore, an approach to automatically classifying and allocating the individual energy consumers using recorded consumption data and features and data structures extracted therefrom must be effected. The method of identifying a plurality of energy consumers using particular feature patterns and automatically dividing them into energy profile groups is divided into a plurality of processes in this case. The aim in this case is to automatically discover decision-relevant but previously unknown relationships and links in the structures of the multiplicity of individual energy consumption time series. In order to be able to compare the energy consumption time series of a plurality of energy consumers in a simpler manner with one another, they are preprocessed in a first step, that is to say the individual energy consumption time series of all energy consumers (for example taken from meter databases of the power suppliers) are first of all subjected to normalization together.

By way of example, the database is assumed to be an (anonymized) data stock comprising individual energy consumption time series of N energy consumers with a temporal resolution of 15 minutes. It is first of all defined in advance that energy consumers are intended to be divided into energy profile groups using a consumption pattern based on a consideration time window of the length of one day. It goes without saying that other lengths of time windows, for example half a day, a week, a month etc., are likewise possible. In the present case, an energy consumption time series consists of 96 consumption values per day, in which case a full day is defined from 0:00 to 23:45. The temporally unlimited time series of each energy consumer are consequently first of all subdivided into daily patterns according to the consideration time window, that is to say a data point or an energy consumption time series is described by the multidimensional (specifically: 96-dimensional) input vector $x_{i,j}=[x_1, x_2, \ldots x_{96}]^T$, where i indicates the number of the energy consumer and j indicates the number of the day considered.

The multidimensional input vectors of a plurality of energy consumers are now organized across all energy consumers in a large data matrix X of the size (Nxd)x96, where d represents the number of available daily patterns for each energy consumer.

In a next step, the data are first of all normalized, with the result that the following then applies to each row, that is to say each energy daily consumption time series, in the matrix X:

$$\sum_{n=1}^{96} X_{i,n} = 1$$

Figure 2:
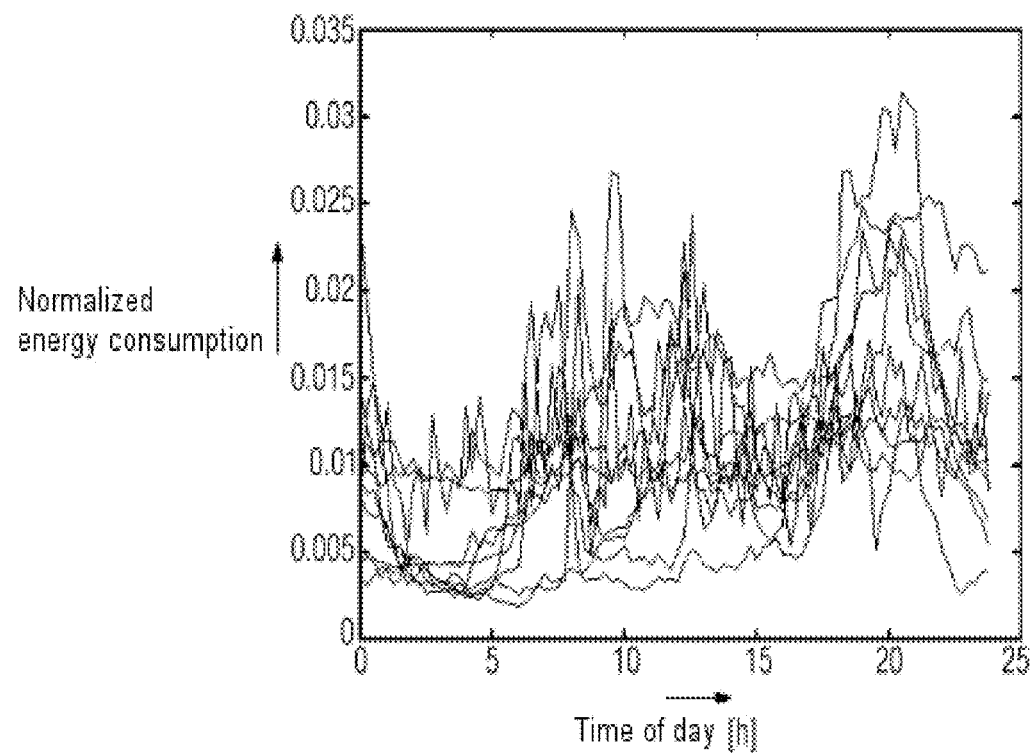
FIG. 2 shows a graph having preprocessed energy consumption time series of a plurality of energy consumers.
Figure 3:
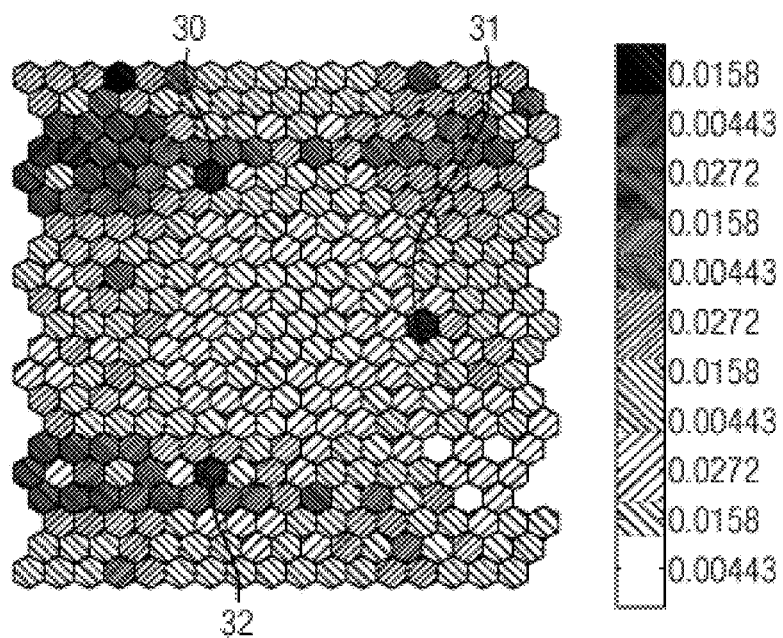
FIG. 3 shows a schematic view of a self-organizing map trained with energy consumption time series of existing energy consumers.
Figure 4:
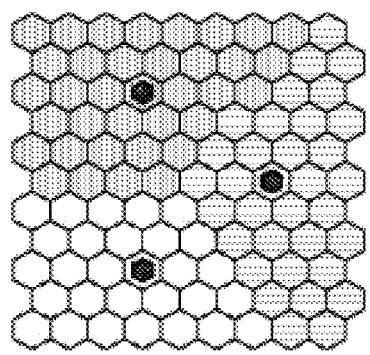
FIG. 4 shows the self-organizing map from FIG. 3 with energy profile groups which have been entered.

This results in each energy consumption time series being reduced solely to its "pattern information content" and in the pattern not being disrupted by pattern-independent offsets. Furthermore, the data can be sorted in advance according to the season and working day/non-working day in order to exclude rough temporal influences to the greatest possible extent. Optionally, so-called outliers (abnormal patterns which occur only rarely) can also be discovered and rejected if necessary. This step would reduce distortion effects caused by outliers during the subsequent cluster analysis and during training of the classification algorithm and would increase the performance thereof. In order to conclude the data preprocessing, energy consumption time series which are incomplete on account of recording errors can be rejected. FIG. 2 shows the energy consumption time series which have been preprocessed, in particular normalized, according to the described steps for working days of ten energy consumers in an exemplarily assumed period of three months in the spring; a unique classification—also of a manual type—also does not yet appear to be readily possible for this comparatively small number of time series (in practice, several hundred time series are often considered in this case).

The aim of the next step is to transform the data into a dimensionally reduced feature space in order to be able to conduct a targeted data analysis in said feature space. In this case, a search is carried out for energy profile groups which differ structurally in the feature space, that is to say their similarities or dissimilarities can be verified by certain distances and the energy profile groups can therefore be distinguished. In the present example, the method of self-organizing maps (SOM) which is known per se and belongs to the so-called unobserved learning methods is used for the transformation. In such learning methods, a target output is not predefined and an error function therefore cannot be defined either. Nevertheless, self-organizing maps are able to independently discover structures belonging to the same class from high-dimensional feature spaces in an output space of a lower dimension and therefore to organize themselves. This phase is referred to as the learning or training phase of the self-organizing map.

After the map has been trained by means of the training data, that is to say by means of the multidimensional energy consumption time series provided by the already existing energy consumers, multidimensional input vectors which are introduced to the map excite only those areas of the map which are similar to the input vector. Therefore, the distances between the individual map elements can be converted into a map subdivided in a suitable manner, for example by means of color graduations, the so-called unified distance matrix (U-matrix), as is shown by way of example in FIG. 3 using different hatching, in which case, in the specific example, tight hatching represents long distances (dissimilarity) and wide hatching represents map elements which are close together (similarity). This representation now allows groups or clusters to be analyzed or detected.

A search is now carried out for the optimal number of energy profile groups in the resulting map (FIG. 3) using the k-means algorithm which is known per se, in which case the group number k can be either predefined or can emerge from optimization, in which case the Davies-Bouldin index, for example, is used as an optimality criterion for selecting k. For the present data, k=3 energy profile groups can be found; three group centers 30, 31, 32 are accordingly entered in FIG. 3. The surrounding map elements and their weight vectors are each allocated to a group center and therefore to one of the energy profile groups according to the distances found using the k-means method. The resulting assignment is illustrated, by way of example, in FIG. 4.

A characteristic group energy consumption time series can be assigned to each of the energy profile groups using the position of the respective group center on the map. FIG. 5 shows the resulting weight vectors or group energy consumption time series of the map elements corresponding to the group centers, that is to say the three representative consumption patterns as a function of the time of day.

In the last step, a generic classification algorithm can now be developed using the identified information relating to the individual energy profile groups and their group energy consumption time series, which classification algorithm automatically allocates new energy consumers previously unknown to the map to one of the energy profile groups found on the basis of their respective energy consumption time series $x_{i,j}$ (preprocessed in a corresponding manner). Classification models such as the "nearest neighbor method" ("k-nearest neighbor") or the "learning vector quantization method", for example, can be used for this purpose. The classification result of unknown (preprocessed) test data using the nearest neighbor method on the basis of the map which has already been trained is illustrated, by way of example, in FIG. 6. In this case, the energy consumption time series allocated to the energy profile groups and their mean value in the form of a solid line are illustrated. The similarity of the mean values to the group energy consumption time series belonging to the group centers of the energy profile groups is obvious.

It is noted that the group formation and classification routines can be calculated and adapted any number of times, that is to say regularly or in an event-controlled manner, for example basically for each new data point. In addition, different routines could be calculated, for example for the type of day or season, or—in order to conduct only one routine—the time information could be transferred to the data space using a binary indicator function.

The invention claimed is:

1. A method of operating an electrical energy supply network, the energy supply network having a plurality of electrical energy consumers and/or energy generators connected to a common control device, the method which comprises:
   providing at least two energy profile groups;
   assigning a plurality of energy devices to a common energy profile group based on a time series of each one of the plurality of energy devices, wherein each one of the plurality of energy devices is selected from the group consisting of: the energy consumers in which case, the time series is an energy consumption time series, and the energy generators in which case, the time series is an energy generation time series;
   assigning a further energy consumer to one of the energy profile groups using at least one energy consumption time series characteristic of the further consumer and/or assigning a further energy generator to one of the energy profile groups using at least one energy generation time series characteristic of the further generator; and
   operating, with the control device, all energy generators and/or energy consumers in the common energy profile group by the common control device using a group energy consumption time series or group energy generation time series characteristic of the respective energy profile group.

2. The method according to claim 1, wherein the step of providing the energy profile groups comprises:
   examining for the energy consumption time series of the energy consumers of the energy supply network and/or the energy generation time series of the energy generators of the energy supply network; and
   combining energy consumption time series and energy generation time series similar in a common energy profile group based on the examining.

3. The method according to claim 2, which comprises:
   providing the energy consumption time series and/or the energy generation time series as multidimensional vectors which represent a measured power obtained or delivered over a predefined consideration time window for a plurality of measurement times;
   mapping the multidimensional vectors to a dimensionally reduced feature space in order to examine the energy consumption time series or energy generation time series; and
   determining the energy profile groups inside the dimensionally reduced feature space.

4. The method according to claim 3, which comprises mapping the multidimensional vectors to a dimensionally reduced feature space using a method of self-organizing maps.

5. The method according to claim 4, which comprises carrying out a k-means method or an extended k-means method for determining the energy profile groups in the dimensionally reduced feature space.

6. The method according to claim 2, which comprises preprocessing the energy consumption time series and/or energy generation time series using normalization before performing the examinings.

7. The method according to claim 1, wherein the step of assigning the further energy consumer or the further energy generator to one of the energy profile groups comprises:
   comparing the energy consumption time series of the further energy consumer or the energy generation time series of the further energy generator with the model energy consumption time series characteristic of the respective energy profile group or the model energy generation time series characteristic of the respective energy profile group; and
   assigning the further energy consumer or further energy generator to one of the energy profile groups based on the comparing step.

8. The method according to claim 7, wherein the comparing step comprises carrying out a nearest neighbor method or a learning vector quantization method.

9. The method according to claim 1, which comprises repeatedly providing the energy profile groups and/or assigning the energy consumers and/or energy generators to energy profile groups at regular intervals.

10. The method according to claim 1, which comprises providing the energy profile groups and/or assigning the energy consumers and/or energy generators to energy profile groups in an event-controlled manner.

11. A system for operating an electrical energy supply network with a plurality of electrical energy consumers and/or energy generators, the system comprising:
   a control device connected to the energy generators and/or energy consumers and configured to:
   assign respective energy consumers to a common one of a plurality of energy profile groups based on energy consumption time series of the energy consumers and/or assign respective energy generators to a common one of a plurality of energy profile groups based on energy consumption time series of the energy generators;
   assign a further energy consumer to one of the energy profile groups using at least one energy consumption time series characteristic of the further consumer and/or assigning a further energy generator to one of the energy profile groups using at least one energy generation time series characteristic of the further generator; and
   operate all energy generators and/or energy consumers in the common energy profile group using a group energy consumption time series or group energy generation time series characteristic of the respective energy profile group.

* * * * *